United States Patent [19]

Keller

[11] 4,190,939

[45] Mar. 4, 1980

[54] VEHICLE TIRE SUN SHIELD AND METHOD OF INSTALLING SAME

[76] Inventor: Ervin J. Keller, 15 Long Point Rd., Germfask, Mich. 49836

[21] Appl. No.: 942,434

[22] Filed: Sep. 14, 1978

[51] Int. Cl.² .................. B23P 11/02; B65D 85/04; B65D 85/06; B62B 9/16
[52] U.S. Cl. .................................. 29/451; 150/54 B; 280/43.24; 280/156; 280/160; 280/762
[58] Field of Search .............. 29/451; 150/54 B, 54 A; 280/28.5, 289 S, 160, 152.05, 762, 768, 152 R, 156, 43.24

[56] References Cited

U.S. PATENT DOCUMENTS

| | | | |
|---|---|---|---|
| 2,019,988 | 11/1935 | Lyon | 150/54 A |
| 2,073,845 | 3/1937 | Lyon | 150/54 A |
| 2,387,188 | 10/1945 | Spingler | 280/160 |
| 2,835,222 | 5/1958 | Hall | 150/54 A |

FOREIGN PATENT DOCUMENTS

996699  6/1965  United Kingdom .................. 150/54 B

*Primary Examiner*—Charlie T. Moon
*Attorney, Agent, or Firm*—Learman & McCulloch

[57] ABSTRACT

A tire sun shield for use upon a load supporting wheel of a parked vehicle is formed from a one-piece member having a front face of a diameter generally corresponding to that of the tire to be shielded and an integral axially extending skirt joined to the front face along its outer periphery. The lower portion of the shield is cut away across a chord of the front face and through the skirt, forming opposed axially extending gripping edges on the skirt which are spaced from each other by a distance slightly less than that of a normal "load flat" of the tire when the tire is supporting a normal load. After the load on the tire is removed to permit the shield to be placed over the front face of the tire and then is reapplied, the gripping edges on the skirt bite into the tire at the opposite ends of the load flat to firmly retain the shield in position on the wheel, and inhibit its removal by wind force or for purposes of theft.

4 Claims, 6 Drawing Figures

VEHICLE TIRE SUN SHIELD AND METHOD OF INSTALLING SAME

BACKGROUND OF THE INVENTION

The purpose of the present invention is to provide a sun shield for the tires of a parked vehicle. Shields of this type are especially useful on house trailers or other vehicles which are parked at one location for an extended period of time. Prolonged exposure of the vehicle tires to direct sunlight adversely affects the rubber tire. This problem is particularly acute in trailer parks in the southern and western United States where trailers may be parked in one spot for several weeks at a time with the tires receiving the same exposure to the sun each day. Within these parks, many make-shift measures can be observed for shading tires from the sun, such as pieces of plywood or temporary canvas awnings. These make-shift devices are neither particularly attractive nor particularly practical where any substantial amount of wind is encountered.

The present invention is especially designed to provide a sun shield which can be easily applied to the vehicle tire and which will stay in place firmly in the face of any normally encountered winds while at the same time presenting a reasonably attractive appearance.

SUMMARY OF THE INVENTION

A sun shield according to the present invention may be easily molded or otherwise formed from any of several opaque plastic materials. The shield is formed to a generally shallow cup-like shape conformed to axially slip onto a mounted vehicle wheel from the outer side of the wheel. An opening is cut or otherwise formed in the lower portion of the shield along a chord of the circular shield and through the axially entending skirt of the shield. The shield is readily mounted upon the tire by jacking the vehicle up until the tire is clear of the ground. The shield is then slipped onto the tire with the opening described above at the bottom of the wheel. When the jack is lowered so that the tire returns to engagement with the ground, the ground engaging portion of the tire becomes flattened as the load is applied to the wheel and as the tire is thus deformed, it spreads within the opening so that the tread portion of the tire engages the opposed edges of the opening which extend across the skirt, these latter edges biting into the tire tread to create a firm grip holding the shield in place upon the wheel.

If desired, a generally similar opening can be formed in the top portion on the shield, this opening frequently being desirable for purposes of clearance of adjacent parts of the vehicle during installation.

Other objects and features of the invention will become apparent by reference to the following specification and to the drawings.

IN THE DRAWINGS

Figure 1:
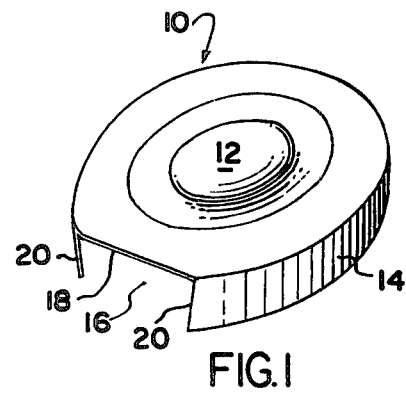
FIG. 1 is a perspective view of a sun shield embodying the present invention.
Figure 5:
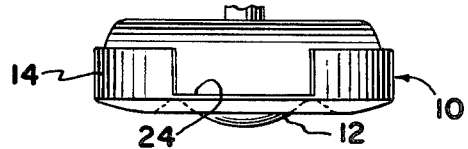
FIG. 5 is a top plan view of a vehicle wheel with the shield in place.

A tire sun shield embodying the present invention is shown in a perspective view in FIG. 1. The shield, designated generally 10, preferably is formed, as by a thermoforming or molding operation from any of several commercially available opaque plastic materials which will produce the shallow cup or bowl-shaped shield in a relatively thin sheet-like structure possessing a reasonable amount of rigidity.

The shield 10 consists of a one piece member defined by a circular front face 12 having a skirt 14 integrally joined to the outer periphery of front face 12 and projecting axially rearwardly from the front face. Front face 12 in the usual case will be contoured to conform generally to the hubcap and sidewall of the tire as generally shown in the drawing, the contouring of the front face providing a somewhat increased rigidity to the structure in addition to providing adequate clearance for the wheel hubcap to enable the shield to be seated axially against the tire.

Figure 6:
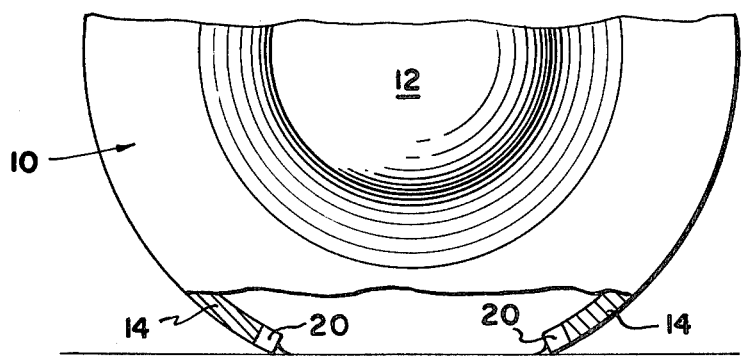
FIG. 6 is an enlarged view of the lower portion of the shield and wheel as shown in FIG. 3.

An opening 16 is formed in the bottom of the shield, the edges of the opening being defined by a first edge 18 which extends along a chord of the circular front face and a pair of opposed gripping edges 20 which extend generally axially across skirt 14 from the opposite ends of edge 18. When installed upon a vehicle wheel, the edge 18 is oriented upon the wheel, as best seen in FIGS. 2, 3 and 6 to extend horizontally at the bottom of the wheel.

The opposed edges 20 of opening 16 are preferably convergent in their extent away from front face 12 so that the width of opening 16 at the open side of the shield is less than that adjacent the front face.

The length of the first edge 18, and thus the maximum spacing between the opposed gripping edges 20 is selected in accordance with the so called "load flat" of the tire upon which the shield is to be mounted; When a normally circular inflated tire supports a loaded vehicle, that portion of the tire which is engaged with ground is deformed by the load and flattened, as best seen in FIGS. 3 and 6. For a typical tire employed on over the road house trailers the length of the "load flat" will normally be approximately nine inches. If the normal "load flat" has a length of nine inches, the length of the edge 18, and thus the maximum space between the opposed edges 20 will be selected to be slightly less, as for example, approximately eight and one half inches.

Figure 2:
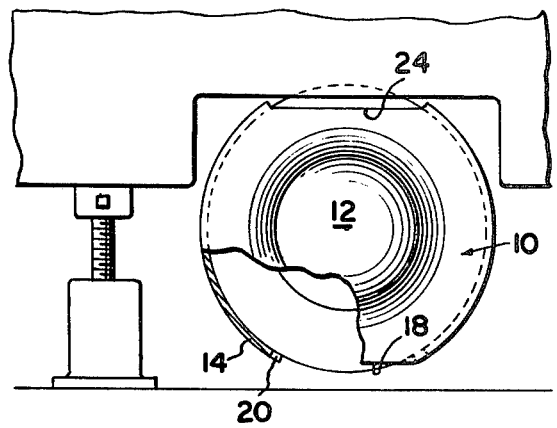
FIG. 2 is a side elevational view of a portion of a vehicle showing the initial application of a shield of the present invention to a jacked up vehicle wheel.
Figure 3:
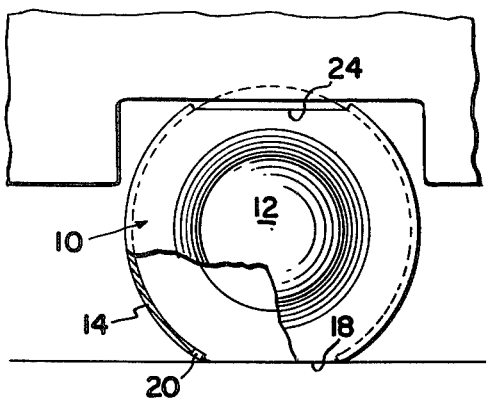
FIG. 3 is a view similar to FIG. 2 showing the shield in place with the jack removed and the wheel in its normal load supporting relationship to the vehicle.
Figure 4:
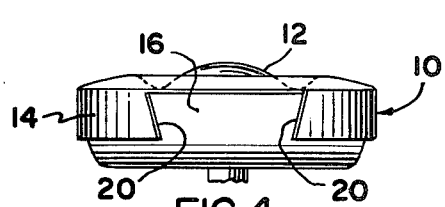
FIG. 4 is a bottom view of a vehicle wheel with the shield in place.

Referring now to FIGS. 2 and 3, the manner in which the shield is installed upon a tire is there illustrated. The vehicle is first, as indicated in FIG. 2, jacked up to a distance such that the wheel upon which the shield is to be mounted is clear of ground. The shield is so dimensioned that in this situation the shield can be slipped axially onto the wheel from the outer side, the skirt 14 sliding easily across the vehicle tread until the inner surface of front face 12 engages the tire sidewall. In some cases, it may be desirable or necessary to cut off the top portion of the shield 10 as indicated generally at 24 to provide clearance for the shield during the installation. It will be noted that with the vehicle jacked up as indicated in FIG. 2, the tire presents a circular periphery.

Referring now to FIGS. 3 and 6, when the vehicle is lowered and the jack is removed, the tire is no longer circular, but instead is deformed to establish the load flat indicated in FIG. 3. Because of the inward convergence of side edges 20, the portion of those edges 20 at the free edge of skirt 14 are engaged first by the expanding load flat as the tire contacts the ground upon lowering of the jack. A progressive gripping or biting of the tire by the edges 20 occurs which tends to draw the shield axially against the tire. When the full weight of the vehicle is supported on the tire, the shield is firmly held with the inwardly convergent edges 20 providing an extremely strong resistance to outward axial movement of the shield.

As employed in the following claims, the term "load flat" is defined as the flattened ground engaged portion of the tire established by the deformation of a normally inflated tire when supporting a normally loaded vehicle. The length of the load flat is its dimension measured in a plane radial to the tire axis of rotation.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

I claim:

1. A tire sun shield for use upon a load supporting wheel of a parked vehicle comprising a generally radially extending circular front face of a diameter substantially equal to the outer diameter of a tire to be shielded, an axially extending skirt fixedly joined to the outer periphery of said front face, said front face and said skirt being of opaque material and defining a shallow generally cup-shaped shield member conformed to snugly receive the tire of a vehicle wheel with said front face overlying the outer side portions of the tire and said skirt overlying at least the axially outer portion of the tire tread, said shield member having an opening therein through said skirt and the lower portion of said front face wherein the edges of said opening are defined by a horizontal edge extending along a chord of the circular front face and opposed gripping edges extending generally axially entirely across said skirt from the opposite ends of said horizontal edge, the distance between the opposed gripping edges being slightly less than the length of the normal "load flat" of the tire.

2. The invention defined in claim 1 wherein said shield member has a second opening therein through said skirt and the upper portion of said front face, the edges of said second opening being defined by a first edge extending across the upper portion of said front face and a pair of opposed side edges extending across said skirt from the opposite ends of said first edge in conversion relation to each other in their extent away from front face.

3. In combination with a normally inflated, load bearing, resilient vehicle tire having a deformed flattened ground engaging portion defined as a "load flat;" a tire sun shield comprising a generally radially extending circular front face of a diameter substantially equal to the outer diameter of a tire to be shielded with an axially extending skirt fixedly joined to the outer periphery of said front face, said front face and said skirt being of sun ray shielding material and defining a shallow generally cup-shaped shield member conformed to snugly receive the tire of a vehicle wheel with said front face overlying the outer side portions of the tire and said skirt overlying at least the axially outer portion of the tire tread, said shield member having an opening therein through said skirt and the lower portion of said front face wherein the edges of said opening are defined by an edge extending generally along a chord of the circular front face and opposed gripping edges extending generally axially across said skirt from the opposite ends of said horizontal edge, the distance between the opposed gripping edges being slightly less than the length of the "load flat" of the tire and the gripping edges of the skirt being incrementally forced apart so that the shield is stressed and the tire is tightly gripped by the shield.

4. A method of installing a tire sun shield upon the load-supporting inflatable, resilient tire on the wheel of a parked vehicle, which tire is flattened at its lower end by the load it bears, comprising: removing the load from the wheel so that it returns to its cylindrical non-loaded state; placing a sun shield having a generally radially extending circular front face of a diameter substantially equal to the outer diameter of the tire to be shielded with an axially extending skirt joined to the outer periphery of said front face over the front face of the wheel, in shielding relationship with the tire, said shield member having an opening of predetermined extent less than the "load flat" of the tire therein through said skirt and the lower portion of said front face wherein the edges of said opening are defined by a horizontal edge extending along a chord of the circular front face and opposed gripping edges extending generally axially entirely across said skirt from the opposite ends of said horizontal edge; and reapplying the load to the tire to incrementally separate the gripping edges and cause the tire to be tightly gripped by the shield.

* * * * *